United States Patent
Pan

(10) Patent No.: US 10,423,252 B2
(45) Date of Patent: Sep. 24, 2019

(54) ARRAY SUBSTRATE, TOUCH DISPLAY PANEL, AND TOUCH DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Chaohuang Pan, Xiamen (CN)

(73) Assignees: Xiamen Tianma Micro-Electronics Co., Ltd., Xiamen (CN); Tianma Micro-Electronics Co., Ltd., Shenzhen (CN)

(*) Notice: Subject to any disclaimer, the term of this patent is extended or adjusted under 35 U.S.C. 154(b) by 185 days.

(21) Appl. No.: 15/622,842

(22) Filed: Jun. 14, 2017

(65) Prior Publication Data

US 2017/0285823 A1  Oct. 5, 2017

(30) Foreign Application Priority Data

Dec. 21, 2016 (CN) .......................... 2016 1 1191049

(51) Int. Cl.

| G06F 3/041 | (2006.01) |
|---|---|
| G02F 1/1333 | (2006.01) |
| G02F 1/1343 | (2006.01) |
| G02F 1/1345 | (2006.01) |
| G06F 3/044 | (2006.01) |

(Continued)

(52) U.S. Cl.
CPC .......... G06F 3/041 (2013.01); G02F 1/13338 (2013.01); G02F 1/13452 (2013.01); G02F 1/13454 (2013.01); G02F 1/133514 (2013.01); G02F 1/134309 (2013.01); G02F 1/136286 (2013.01); G06F 3/044 (2013.01);
(Continued)

(58) Field of Classification Search
CPC ...... G06F 3/0412; G06F 3/041; G06F 3/0416; G02F 1/13454; G02F 1/13452; G02F 1/136286; G02F 1/134309; G02F 1/13338; G02F 1/133514; G02F 2001/136295; G02F 2001/13629
See application file for complete search history.

(56) References Cited

U.S. PATENT DOCUMENTS

| 2014/0152617 A1* | 6/2014 | Kida | ........................ G06F 3/044 |
|---|---|---|---|
| | | | 345/174 |
| 2014/0285465 A1* | 9/2014 | Hayashi | .................. G06F 3/044 |
| | | | 345/174 |

(Continued)

*Primary Examiner* — Brent D Castiaux
(74) *Attorney, Agent, or Firm* — Anova Law Group, PLLC

(57) ABSTRACT

An array substrate includes a first touch electrode array having m number of strip-shaped first touch electrodes extending in a first direction, a first integrated circuit having m number of touch signal terminals, each of which provides a drive signal to a corresponding first touch electrode; and a plurality of first touch signal lines, each of which is connected between one of the touch signal terminals and one of the first touch electrodes for transmitting the drive signal supplied from each touch signal terminal to the corresponding first touch electrode. The drive signal includes a touch drive signal and a display drive signal; during a display stage, each touch signal terminal supplies the display drive signal to the corresponding first touch electrodes; and, during a touch detection stage, each touch signal terminal supplies the touch drive signal to the corresponding first touch electrode.

18 Claims, 10 Drawing Sheets

(51) Int. Cl.
*G02F 1/1362* (2006.01)
*G02F 1/1335* (2006.01)

(52) U.S. Cl.
CPC .. *G06F 3/0416* (2013.01); *G02F 2001/13629* (2013.01); *G02F 2001/136295* (2013.01)

(56) References Cited

U.S. PATENT DOCUMENTS

| | | | |
|---|---|---|---|
| 2015/0185936 A1* | 7/2015 | Kim | G06F 3/0412 345/174 |
| 2015/0185941 A1* | 7/2015 | Lee | G06F 3/0412 345/173 |
| 2016/0233237 A1* | 8/2016 | Riedel | H01L 27/124 |

* cited by examiner

ARRAY SUBSTRATE, TOUCH DISPLAY PANEL, AND TOUCH DISPLAY DEVICE

CROSS-REFERENCES TO RELATED APPLICATIONS

This application claims priority of Chinese Patent Application No. 201611191049.5, filed on Dec. 21, 2016, the entire contents of which are hereby incorporated by reference.

FIELD OF THE DISCLOSURE

The present disclosure generally relates to the field of display technology and, more particularly, relates to an array substrate, a touch display panel, and a touch display device.

BACKGROUND

A touch display device can use touch electrodes to detect the coordinate position of a user's finger on a display screen of the touch display device, and then performs corresponding display according to the coordinate position.

In an existing touch display device, the touch-control function is usually realized by two layers of touch-electrode layers, and each touch-electrode layer has a plurality of touch electrodes arranged in parallel to each other. The touch electrodes in the two touch-electrode layers intersect along their extension directions. After applying a touch scan signal to each of the touch electrodes on one of the touch-electrode layers, when a user's finger touches the screen of the touch display device, the user's finger and some of the touch electrodes on the screen form a coupling capacitor, and leakage current flows out of the coupling capacitor. By detecting the leakage current using a touch detection circuit, the two intersecting touch electrodes on the two touch-electrode layers forming the coupling capacitor with the user's finger can be determined, and the touch position can also be determined.

With the development of the display technology, how to further narrow the frame area of the display devices has become one of the sought-after objectives of the display technology field. On the other hand, as the display devices move toward high PPI (Pixel per Inch), the size of various drive circuits and the number of various signal lines also increase. In addition, for touch display devices, to realize the touch position detection, it needs to use more drive circuits and signal lines than ordinary display devices.

Therefore, how to achieve narrower frame area while developing display devices with increasingly high PPI has become a technical problem to be solved.

The disclosed systems and methods are directed to solving at least partial problems set forth above and other problems. It should be noted that, the information disclosed in the aforementioned background section is only used to enhance understanding of the background of the present disclosure, and may thus include existing information readily known to those ordinarily skilled in the art.

BRIEF SUMMARY OF THE DISCLOSURE

One aspect of the present disclosure includes an array substrate. The array substrate includes a first touch electrode array having m number of strip-shaped first touch electrodes extending in a first direction, a first integrated circuit having m number of touch signal terminals, each of which is used to provide a drive signal to a corresponding first touch electrode; and a plurality of first touch signal lines, each of which is connected between one of the touch signal terminals and one of the first touch electrodes for transmitting the drive signal supplied from each touch signal terminal to the corresponding first touch electrode. The drive signal includes a touch drive signal and a display drive signal; during a display stage of a frame period, each touch signal terminal supplies the display drive signal to the corresponding first touch electrodes; and, during a touch detection stage of the frame period, each touch signal terminal supplies the touch drive signal to the corresponding first touch electrode.

Another One aspect of the present disclosure includes a display panel. The display panel an array substrate and a color film substrate disposed opposite to the array substrate. The array substrate includes a first touch electrode array having m number of strip-shaped first touch electrodes extending in a first direction, a first integrated circuit having m number of touch signal terminals, each of which is used to provide a drive signal to a corresponding first touch electrode; and a plurality of first touch signal lines, each of which is connected between one of the touch signal terminals and one of the first touch electrodes for transmitting the drive signal supplied from each touch signal terminal to the corresponding first touch electrode. The drive signal includes a touch drive signal and a display drive signal; during a display stage of a frame period, each touch signal terminal supplies the display drive signal to the corresponding first touch electrodes; and, during a touch detection stage of the frame period, each touch signal terminal supplies the touch drive signal to the corresponding first touch electrode.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of the disclosure. Apparently, the drawings described below only correspond to some embodiments of the present disclosure, and it is possible for those ordinarily skilled in the art to derive other drawings from the accompanying drawings without creative effort.

DETAILED DESCRIPTION

Figure 1:
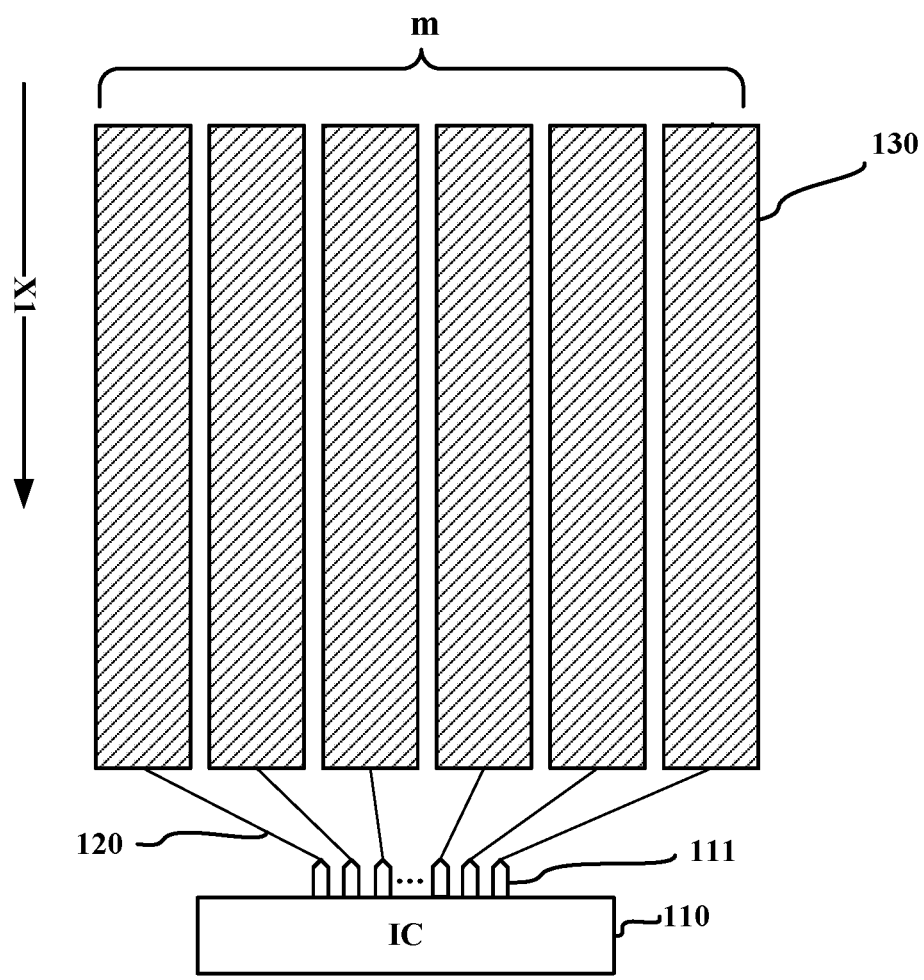
FIG. 1 illustrates a structural diagram of an array substrate consistent with the disclosed embodiments.

Exemplary embodiments will be described in detail hereinafter with reference to accompanying drawings. However, embodiments of the present disclosure may be implemented in many different forms and should not be construed as being limited to the embodiments set forth herein. Rather, these embodiments are provided so that the present disclosure can be understood by those skilled in the art. The described features, structures, or characteristics may be combined in any suitable manner in one or more embodiments. In the following description, numerous specific details are given to provide understanding of embodiments of the present disclosure. Those skilled in the relevant art will recognize, however, that technical solutions of the present disclosure can be practiced without one or more of the specific details, or with other methods, components, devices, or steps, etc.

In addition, the accompanying drawings of the present disclosure are only schematic, like reference numerals in the drawings denote same or like elements, and thus repetitive description thereof may be omitted. Further, in addition to illustrating hardware components, certain block diagrams illustrated in accompanying drawings may be functional entities, and may not necessarily correspond to physically or logically independent entities. These functional entities may be implemented by means of software, or one or more hardware modules or an integrated circuit. Or, these functional entities may be implemented in different networks and/or processor devices and/or microcontroller devices.

FIG. 1 illustrates an exemplary array substrate according to the disclosed embodiments of the present disclosure. As shown in FIG. 1, the array substrate may include a first touch electrode array (not labeled), a first integrated circuit 110, and a plurality of first touch signal lines 120. Other components may also be included.

The first touch electrode array may include m number of strip-shaped first touch electrodes 130 extending in the first direction X1, m is an integer greater than 2. The first integrated circuit 110 may include m number of touch signal terminals 111, each of which is used to provide a drive signal to the corresponding first touch electrode 130. The drive signal may include a touch drive signal and a display drive signal.

Each of the first touch signal lines 120 is connected between one of the touch signal terminals 111 and one of the first touch electrodes 130 for transmitting the drive signal supplied from the touch signal terminal 111 to the first touch electrode 130.

Thus, in the disclosed array substrate, because the touch signal terminals 111 of the first integrated circuit 110 are directly connected to the first touch signal lines 120 to supply the drive signals to the first touch electrodes 130, driving circuitry additionally provided in the frame area to supply the drive signal to each of the first touch electrodes 130 can be avoided, which facilitates the implementation of narrower frames in touch display devices and touch display panels with the disclosed array substrate.

It should be noted that the extension direction X1 of the first touch electrodes 130 is only illustrative and is intended to illustrate that the first touch electrodes 130 are strip-shaped electrodes, but is not used to limit the extension direction of the first touch electrodes 130. Further, although a first touch electrode 130 as shown is electrically connected to a first touch signal line 120, this is only illustrative. One skilled in the art can set the number of first touch signal lines (e.g., one, two or more) connected to the same first touch electrode according to the needs of the actual applications.

In addition, the connection between the first touch electrode 130 and the first touch signal line 120 is also indicative. The first touch signal line may be electrically connected to one end of the first touch electrode or, for example, the first touch signal line may also pass through both ends of the first touch electrode.

Figure 2:
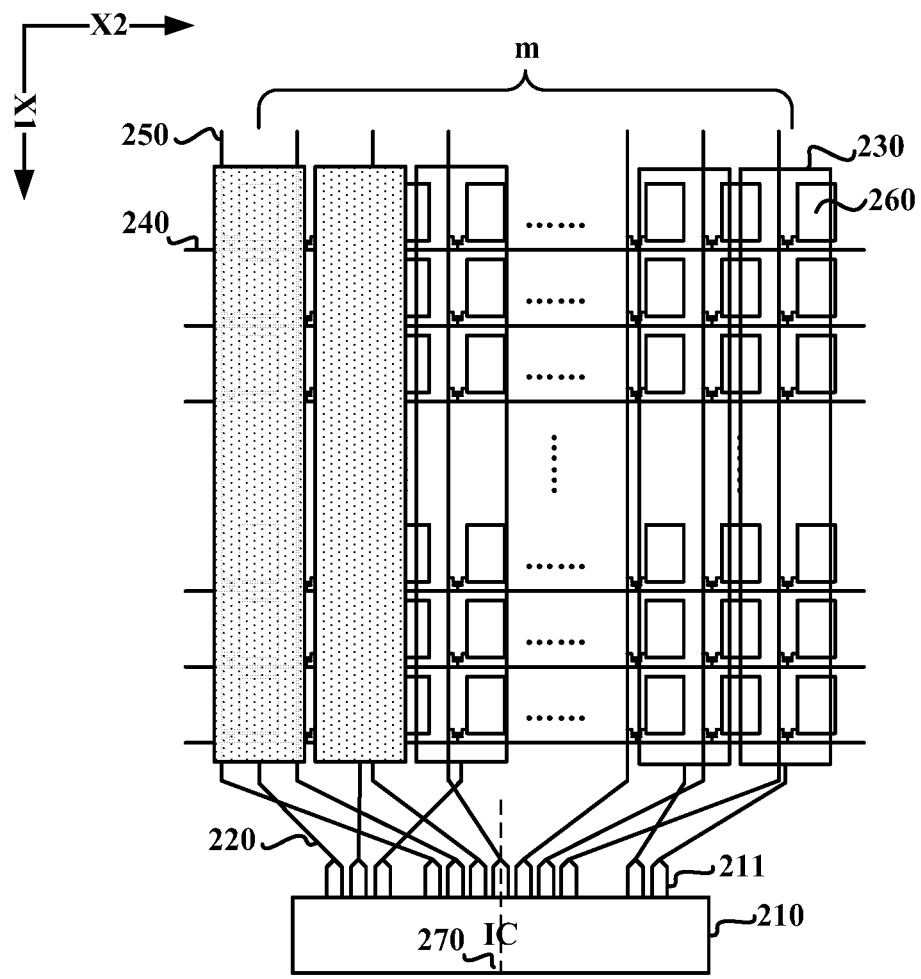
FIG. 2 illustrates a structural diagram of another array substrate consistent with the disclosed embodiments.

FIG. 2 illustrates another exemplary array substrate according to the disclosed embodiments of the present disclosure. As shown in FIG. 2, the array substrate may include a first touch electrode array (not labeled), a first integrated circuit 210, and a plurality of first touch signal lines 220. Other components may also be included.

The first touch electrode array may include m number of strip-shaped first touch electrodes 230 extending in the first direction X1, m is an integer greater than 2. The first integrated circuit 210 may include m number of touch signal terminals 211, each of which is used to provide a drive signal to the corresponding first touch electrode 230.

Each of the first touch signal lines 220 is connected between one of the touch signal terminals 211 and one of the first touch electrodes 230 for transmitting the drive signal supplied from the touch signal terminal 211 to the first touch electrode 230.

Unlike that shown in FIG. 1, the array substrate may also include a plurality of scanning lines 240, a plurality of data lines 250, and a display pixel array formed by intersecting the insulated scanning lines 240 and data lines 250.

The scanning lines 240 are formed in a first metal layer of the array substrate and extend in the second direction X2. The data lines 250 are formed in a second metal layer of the array substrate and extend in the first direction X1. The display pixel array includes a plurality of display pixels 260. In addition, the first touch signal lines 220, the scanning lines 240, and the data lines 250 are insulated from one another.

Thus, in the disclosed array substrate, because the touch signal terminals 211 of the first integrated circuit 210 are directly connected to the first touch signal lines 220 to supply the drive signals to the first touch electrodes 230, driving circuitry additionally provided in the frame area to supply the drive signal to each of the first touch electrodes 230 can be avoided, which facilitates the implementation of narrower frames in touch display devices and touch display panels with the disclosed array substrate.

In certain embodiments, the first integrated circuit 210 may have a first symmetry axis 270 extending in the direction of the data lines. The first integrated circuit 210 may also include scan signal terminals (not shown) for providing a scan drive signal to each scanning line 240 and data signal terminals 212 for providing a data signal to each data line 250. Further, the distance between any one touch drive signal terminal 211 and the first symmetry axis 270 is greater than the distance between the scan drive signal terminal and the first axis of symmetry 270, as well as the distance between the data signal terminal 212 and the first symmetry axis 270. That is, the touch drive signal terminals 211 are in a region far from the first axis symmetry 270, and the scan drive signal terminals and the data signal terminal 212 are in a region near to the first symmetry axis 270.

In certain embodiments, the array substrate may also include a third metal layer, and each of the first touch signal lines 220 may be formed in the third metal layer.

By disposing the first touch signal lines 220 in a different layer from the scanning lines 240 and the data lines 250, the mutual coupling and interference between the first touch signal lines 220 and the scanning lines 240 and the data line 250 can be reduced. Thus, when the touch signal lines 220 are used to transmit signals, the transmission speed is faster and the signal attenuation is smaller.

Further, for array substrates shown in FIG. 1 and FIG. 2, when the disclosed array substrates are applied to a liquid crystal touch display panel, the first touch electrodes 130 (or the first touch electrodes 230) may also be multiplexed as a common electrode. The drive signals provided by the touch signal terminals 111 (or the touch signal terminals 211) may include a touch drive signal and a display drive signal.

Specifically, in the display stage of the frame period, each of the touch signal terminals 111 (or the touch signal terminals 211) may provide a display drive signal to each of the first touch electrodes 130 (or the first touch electrodes 230) so that the liquid crystal molecules may rotate under the electric field between each of the first touch electrodes 130 (or the first touch electrodes 230) and the pixel electrodes, so as to realize the image display.

In the touch detection stage of the frame period, each touch signal terminal 111 (or touch signal terminal 211) supplies a touch drive signal to each of the first touch electrodes 130 (or the first touch electrodes 230).

Further, in certain embodiments, the touch detection stage within one frame period (1 FRAME) may include k number of touch detection sub-stages, where k is an integer greater than or equal to 2.

In the i-th touch detection sub-stage, the touch signal terminal electrically connected to the j-th first touch electrode provides a touch drive signal to the j-th first touch electrode, and the touch signal terminals electrically connected to the other first touch electrodes provide a display drive signal to the other first touch electrodes, where i, j, k each is a natural number, and $1 \leq i, j \leq k$, and $m \leq k$.

Further, there is no definite relationship between i and j. That is, during any touch detection sub-stage of one frame period, as long as one first touch electrode is applied with a touch drive signal and, during one frame period, each first touch electrode is applied at least one touch drive signal, touch position detection can be realized.

Figure 3A:
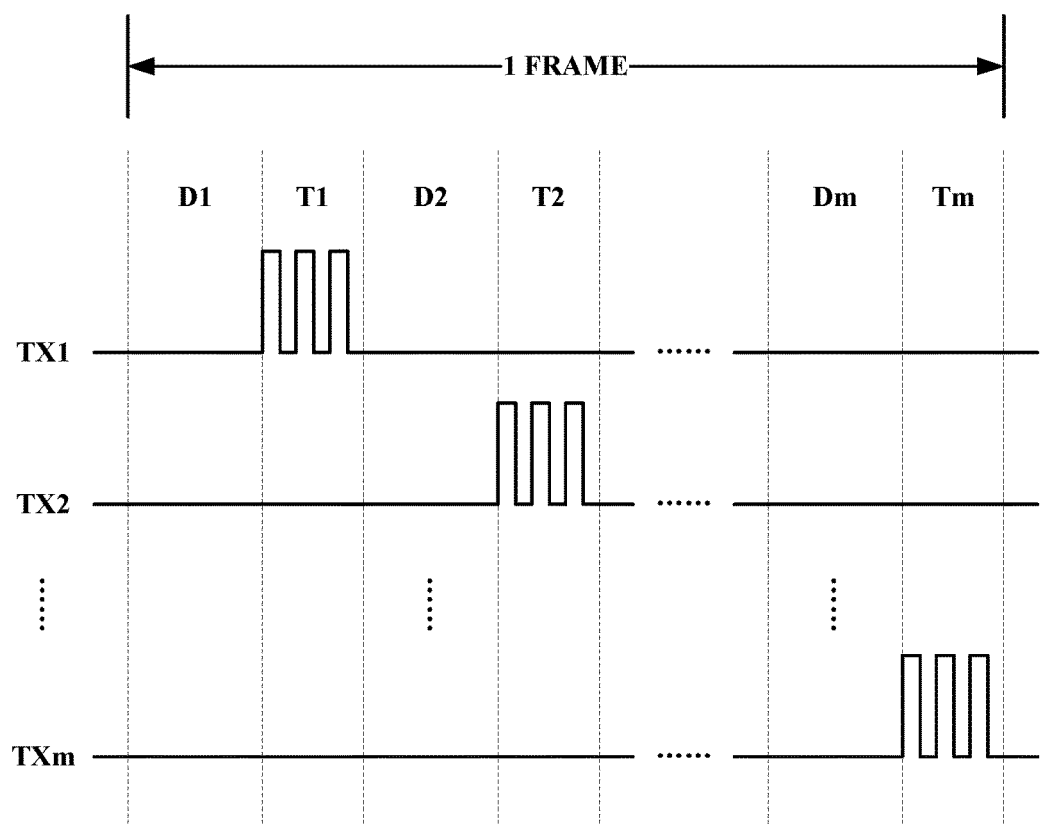
FIGS. 3A-3D illustrate time sequence diagrams of drive signals of certain array substrates consistent with the disclosed embodiments.

FIG. 3A illustrates a time sequence diagram of an exemplary drive method. As shown in FIG. 3A, assuming that i=j and k=m, one frame period (1 FRAME) includes m touch detection sub-stages, and the touch drive signal is applied to the i-th first touch electrode during the i-th touch detection sub-stage, the drive signal on each first touch electrode TX is illustrated separately.

Specifically, in the first touch detection sub-stage T1 of the one frame period, the integrated circuit may apply a touch drive signal to the first touch electrode TX1 through the first touch signal terminal, and may apply a display drive signal(s) to the other first touch electrodes through the other touch signal terminals.

In the second touch detection sub-stage T2 of the one frame period, the integrated circuit may apply a touch drive signal to the first touch electrode TX2 through the second touch signal terminal, and may apply a display drive signal(s) to the other first touch electrodes through the other touch signal terminals.

In the m-th touch detection sub-stage Tm of the one frame period, the integrated circuit may apply a touch drive signal to the first touch electrode TXm through the m-th touch signal terminal, and may apply a display drive signal(s) to the other first touch electrodes through the other touch signal terminals.

Further, in each of the display sub-stages D1 to Dm of the one frame period, the integrated circuit supplies the display drive signals to the respective first touch electrodes through the corresponding touch signal terminals.

Figure 3B:
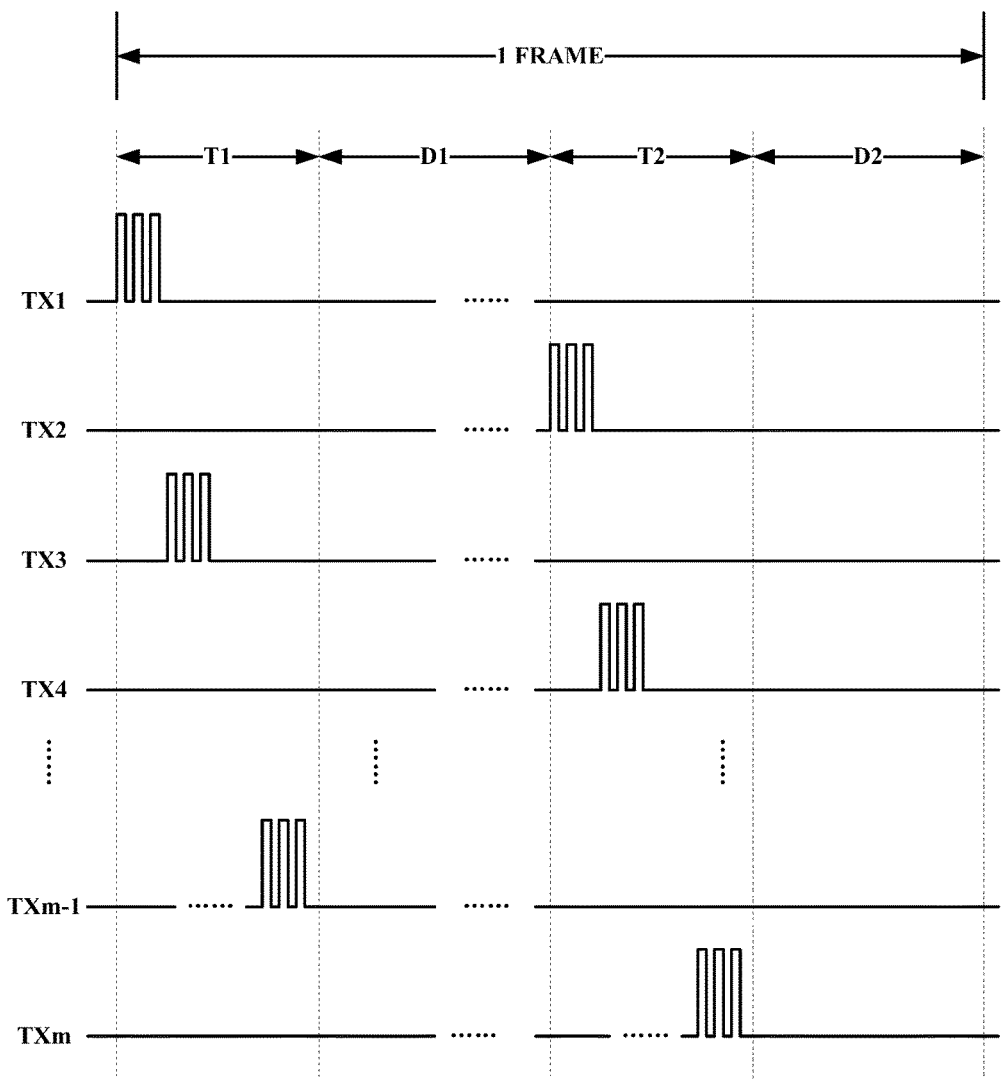

FIG. 3B illustrates a time sequence diagram of another exemplary drive method. As shown in FIG. 3B, the touch detection stage of the one frame period includes two touch detection sub-stages T1 and T2.

In one touch detection sub-stage, for example, in the first touch detection sub-stage T1, the touch signal terminals electrically connected to the odd-numbered first touch electrodes (TX1, TX3, . . . ) sequentially apply a touch drive signal to the odd-numbered first touch electrodes, and the touch signal terminals electrically connected to the even number of first touch electrodes (TX2, TX4, . . . ) apply the display drive signal to the even-numbered first touch electrodes.

In the other touch detection sub-stage, for example, in the second touch detection sub-stage T2, the touch signal terminals electrically connected to the even number of first touch electrodes (TX2, TX4, . . . ) sequentially apply a touch drive signal to the even-numbered first touch electrodes, and the touch signal terminals electrically connected to the odd-numbered first touch electrodes (TX1, TX3, . . . ) apply the display drive signal to the odd-numbered first touch electrodes.

In this way, during one touch detection sub-stage, the touch drive signal is sequentially applied to the first touch electrodes which are not adjacent to each other, it is possible to avoid the problem that, when the touch drive signal is applied to adjacent first touch electrodes, the interference between the adjacent two first touch electrodes (e.g., interference due to the parasitic capacitance) can reduce the sensitivity of the touch detection.

Figure 3C:
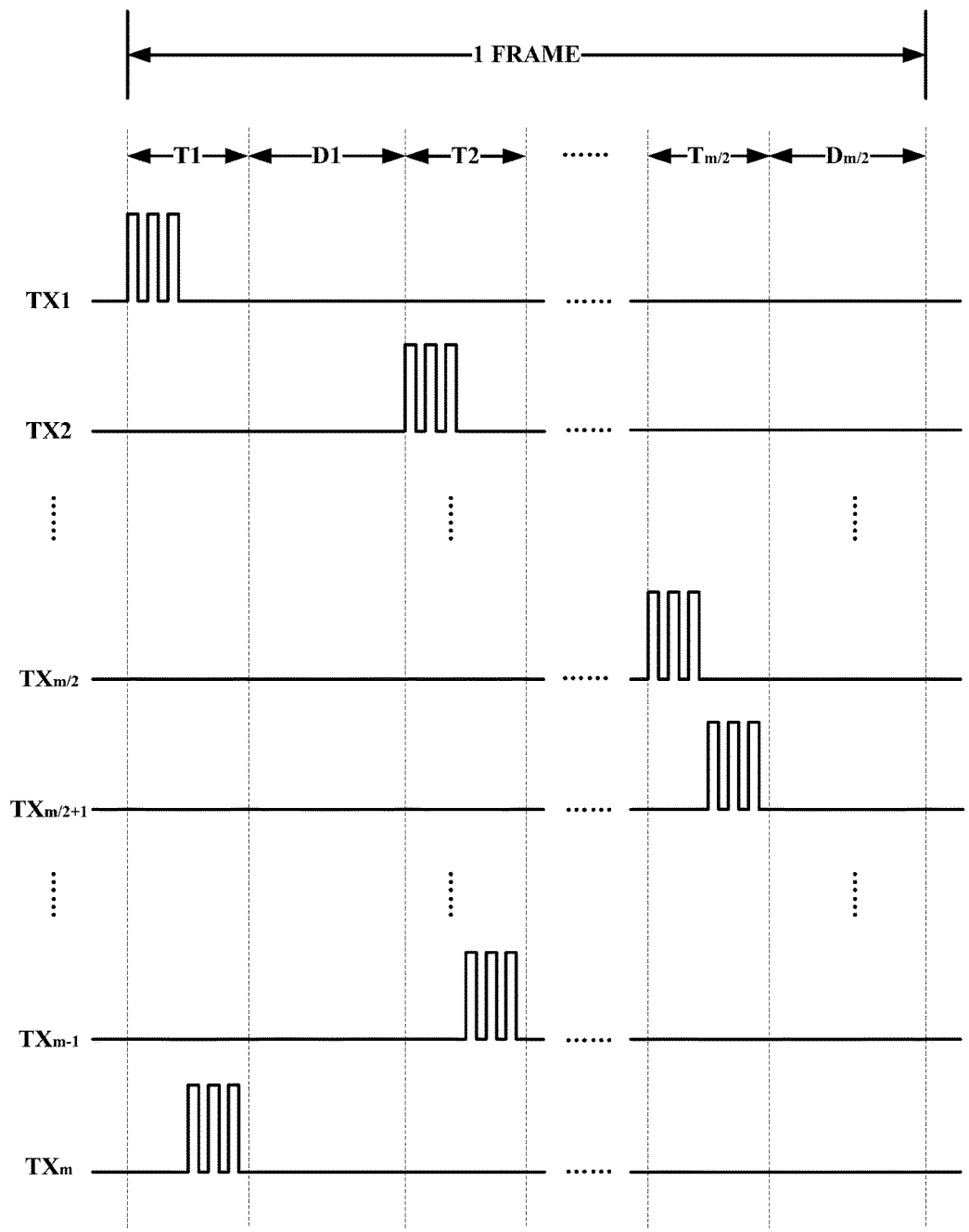

FIG. 3C illustrates a time sequence diagram of another exemplary drive method. As shown in FIG. 3C, the one frame period may include $\lceil m/2 \rceil$ number of touch detection sub-stages T1, T2, . . . , $T_{m/2}$.

In the p-th touch detection sub-stage, the touch signal terminals electrically connected to the p-th first touch electrode and the (m−p+1)-th first touch electrode sequentially apply a touch drive signal to the p-th first touch electrode and the (m−p+1)-th first touch electrode, and the other touch signal terminals electrically connected to other first touch electrodes apply a display drive signal(s) to the other first touch electrodes, where p is a natural number and $1 \leq p \leq \lceil m/2 \rceil$.

Further, when m is an even number, in the first touch detection sub-stage T1, the touch drive signal is applied to the first touch electrode TX1 and the m-th first touch electrode, and a display drive signal is applied to the other first touch electrodes. Similarly, in the second touch detection sub-stage T2, a touch drive signal is applied to the first touch electrode TX2 and the (m−1)-th first touch electrode, and a display drive signal is applied to the other first touch electrodes. In the (m/2)-th touch detection sub-stage $T_{m/2}$, a touch drive signal is applied to the (m/2)-th first touch electrode and the (m/2+1)-th first touch electrode, and a display drive signal is applied to the other first touch electrodes.

In certain embodiments, the first touch electrode array may include q number of first-touch-electrode groups, each first-touch-electrode group may include at least two adjacent first touch electrodes, and the adjacent two first-touchelectrode groups include at least one common first touch electrode, where q is a natural number greater than or equal to 2.

Figure 3D:
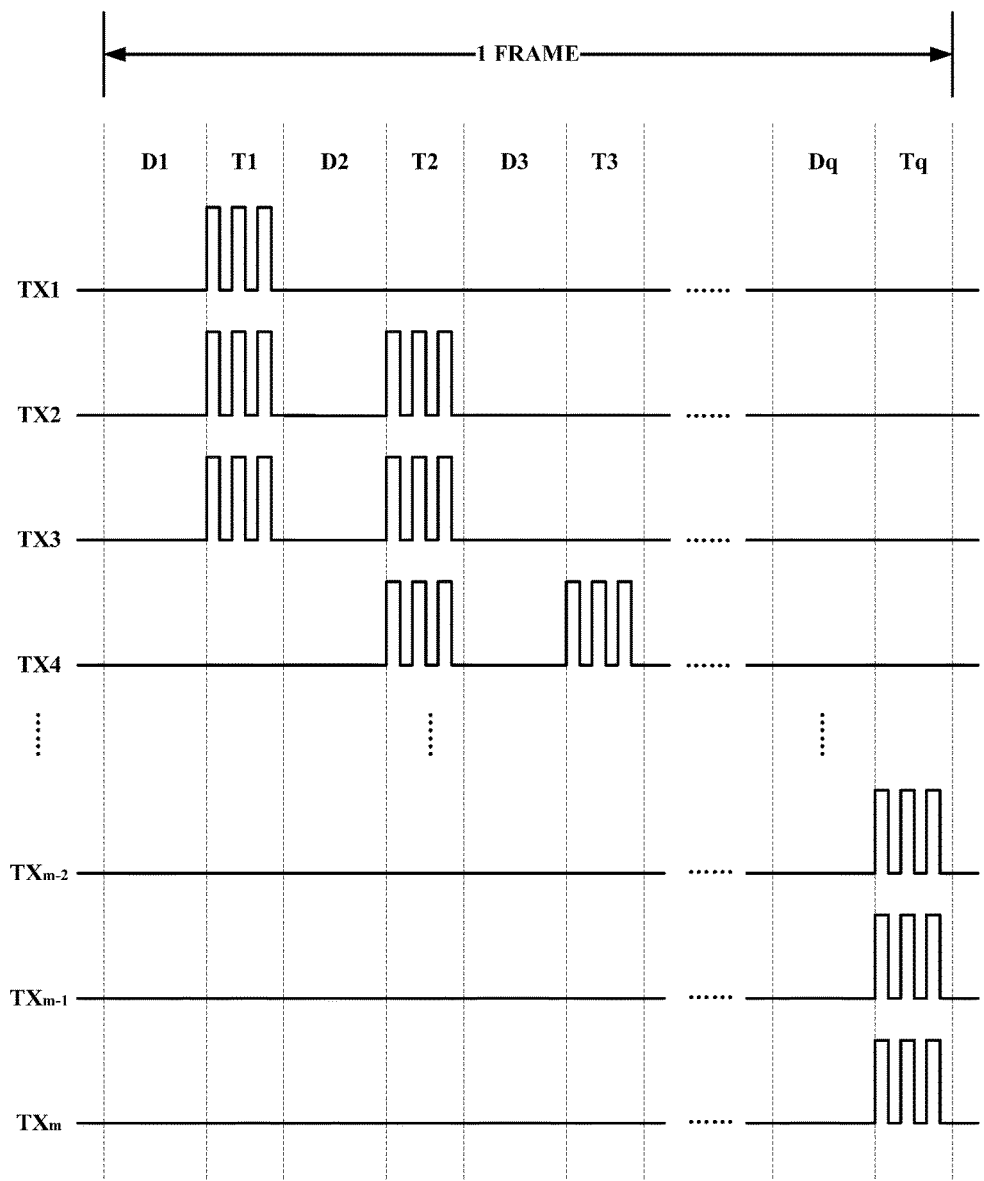

FIG. 3D illustrates a time sequence diagram of another exemplary drive method. As shown in FIG. 3D, a first-touch-electrode group may include 3 adjacent first touch electrodes, and the adjacent two first-touch-electrode groups include two common first touch electrodes.

Further, the one frame period may include at least q number of touch detection sub-stages T1, T2, ..., $T_q$, and during one touch detection sub-stage, the touch signal terminals electrically connected to the first touch electrodes in one first-touch-electrode group simultaneously apply a touch drive signal to each of the first touch electrodes in one first-touch-electrode group.

For example, in the first touch detection sub-stage T1, the touch drive signal is applied to the first touch electrode TX1, the first touch electrode TX2, and the first touch electrode TX3, and a display drive signal is applied to the other first touch electrodes. Similarly, in the second touch detection sub-stage T2, a touch drive signal is applied to the first touch electrode TX2, the first touch electrode TX3, and the first touch electrode TX4, and a display drive signal is applied to the other first touch electrodes. In the q-th touch detection sub-stage Tq, a touch drive signal is applied to the (m−2)-th first touch electrode $TX_{m-2}$, the (m−1)-th first touch electrode $TX_{m-1}$, and the m-th first touch electrode $TX_m$, and a display drive signal is applied to the other first touch electrodes.

It should be noted that FIGS. 3A-3D are merely illustrative and other drive time sequences may also be used. By using the touch signal terminals of the integrated circuit to directly output the corresponding touch drive signals to the first touch electrodes, each touch signal terminal can be able to independently provide a touch drive signal to a corresponding first touch electrode. Thus, the specific timing sequence of each touch drive signal terminal can be adjusted so that the various drive timing sequences and its variations can be used by the disclosed array substrate according to the needs of particular applications. For example, the scanning can be started from any first touch electrode, the touch drive signal can be simultaneously supplied to all the first touch electrodes, or the touch drive signal is supplied to specific electrode groups in a time-multiplexing manner. Other methods may also be used.

Figure 4:
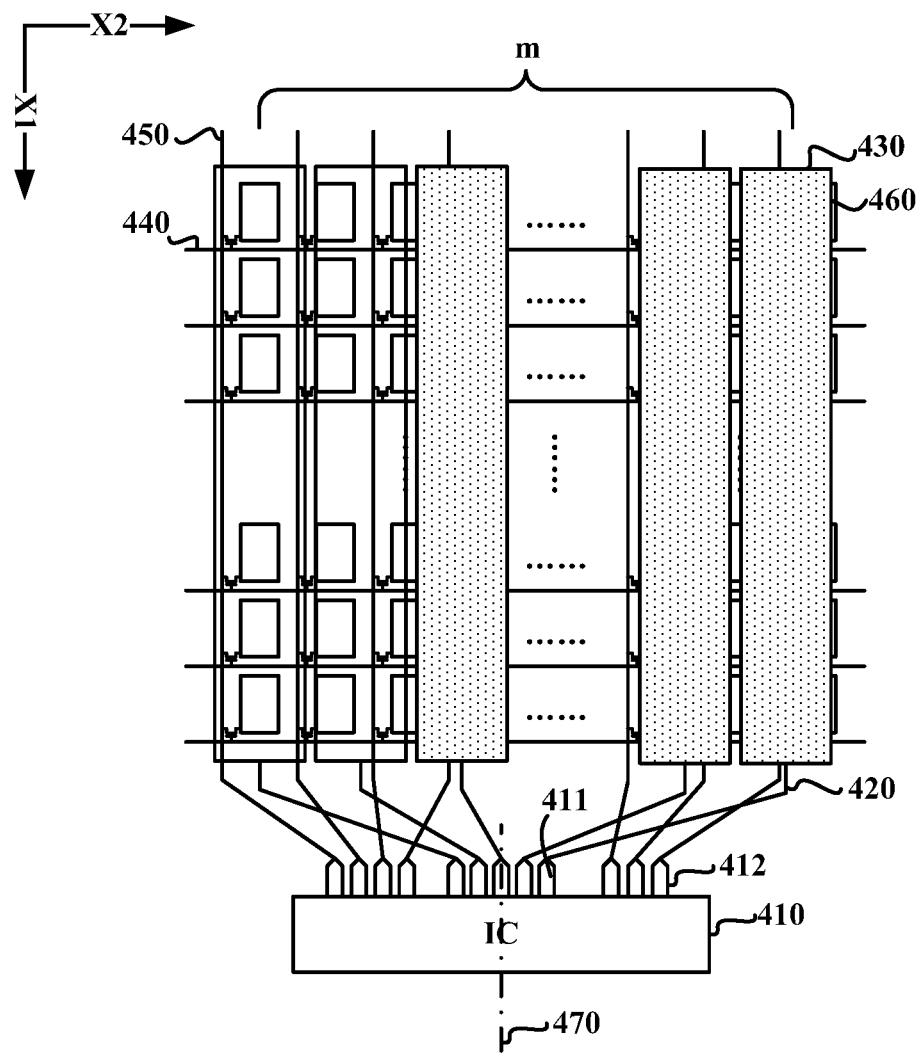
FIG. 4 illustrates a structural diagram of another exemplary array substrate consistent with the disclosed embodiments.

FIG. 4 illustrates another exemplary array substrate according to the disclosed embodiments of the present disclosure. Similar to that shown in FIG. 2, as shown in FIG. 4, the array substrate may include a first touch electrode array (not labeled), a first integrated circuit 410, and a plurality of first touch signal lines 420. Other components may also be included.

The first touch electrode array may include m number of strip-shaped first touch electrodes 430 extending in the first direction X1, m is an integer greater than 2. The first integrated circuit 410 may include m number of touch signal terminals 411, each of which is used to provide a drive signal to the corresponding first touch electrode 430. Each of the first touch signal lines 420 is connected between one of the touch signal terminals 411 and one of the first touch electrodes 430 for transmitting the drive signal supplied from the touch signal terminal 411 to the first touch electrode 430.

Further, the array substrate may also include a plurality of scanning lines 440, a plurality of data lines 450, and a display pixel array formed by intersecting the insulated scanning lines 440 and data lines 450. The scanning lines 440 are formed in a first metal layer of the array substrate and extend in the second direction X2. The data lines 450 are formed in a second metal layer of the array substrate and extend in the first direction X1. The display pixel array includes a plurality of display pixels 460. In addition, the first touch signal lines 420, the scanning lines 440, and the data lines 450 are insulated from one another.

The first integrated circuit 410 may have a first symmetry axis 470 extending in the direction of the data lines. The first integrated circuit 410 may also include scan signal terminals (not shown) for providing a scan drive signal to each scanning line 440 and data signal terminals 412 for providing a data signal to each data line 450.

Unlike that shown in FIG. 2, the distance between any one touch drive signal terminal 411 and the first symmetry axis 470 is smaller than the distance between the scan drive signal terminal and the first axis of symmetry 470, as well as the distance between the data signal terminal 412 and the first symmetry axis 470. That is, the touch drive signal terminals 411 are in a region near to the first axis symmetry 470, and the scan drive signal terminals and the data signal terminal 412 are in a region far from the first symmetry axis 470.

Thus, as the PPI of display panels become higher, the number of scanning lines and data lines on the array substrate is also increasing, and the number of scanning lines and data lines is much greater the number of the first touch signal lines providing the touch drive signal. In this way, by disposing the scan drive signal terminals for supplying the scanning signal and the data signal terminals 412 for supplying the data signal in the region far from the first symmetry axis 470 of the integrated circuit 410, the sum of the distance between the data signal terminals 412 and the data lines 450 can be reduced. Similarly, the distance between the scanning drive signal terminals and the drive circuit providing the scanning signal (for example, the shift register circuit) can also be reduced correspondingly, such that the total length of the wires between the scanning drive signal terminals and the drive circuit providing the scanning signal, and the total length of the wires between the data signal terminals and the data lines can be reduced, facilitating the realization of narrower frame of the touch display panel having the disclosed array substrate.

In addition, in the disclosed array substrate, the display drive signal may be a common voltage signal, and the common voltage signal can be a fixed-level voltage signal.

Figure 5:
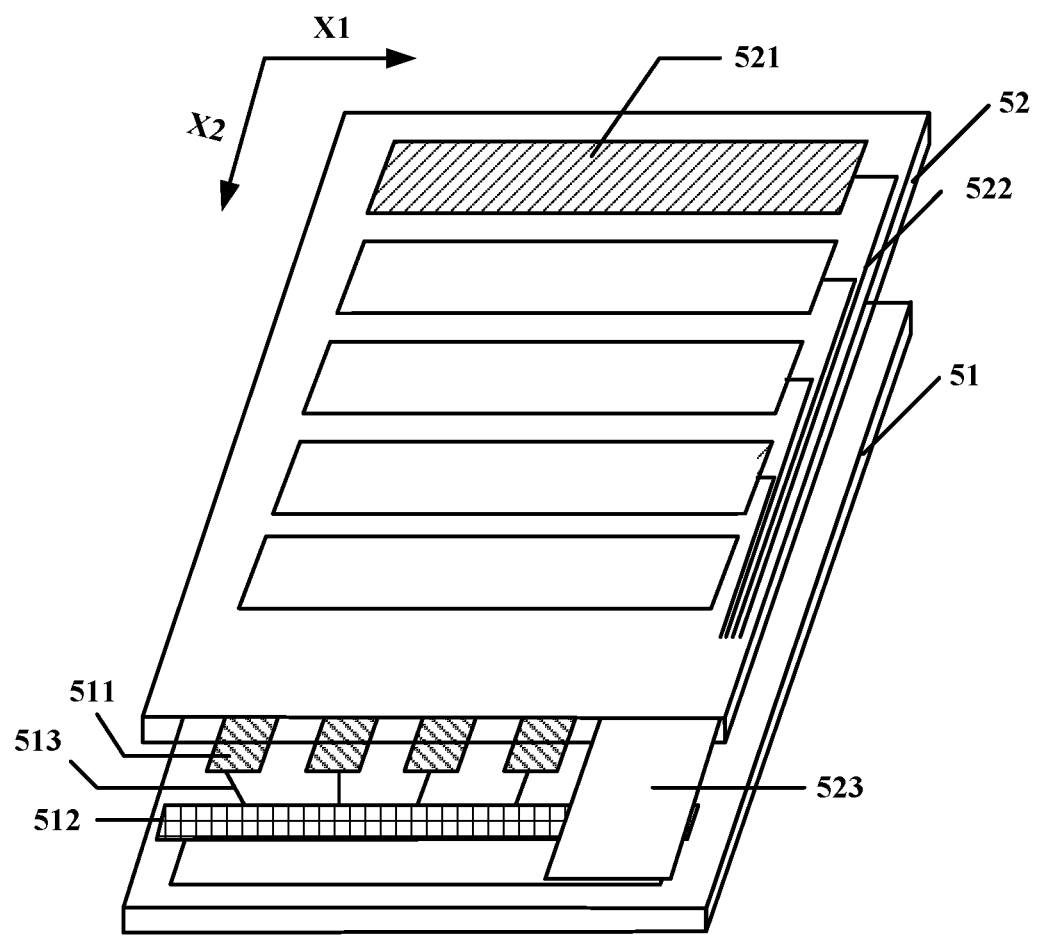
FIG. 5 illustrates a structural diagram of an exemplary touch display panel consistent with the disclosed embodiments.

FIG. 5 illustrates an exemplary touch display panel. As shown in FIG. 5, the touch display panel may include an array substrate 51, and a color film substrate 52 disposed opposite to the array substrate 51. Other components may also be included.

The array substrate 51 may include any disclosed array substrate. The array substrate 51 may include a first touch electrode array having a plurality of first touch electrodes 511, a first integrated circuit 512, and a plurality of first touch signal lines 513.

A second touch electrode array may be provided on the color film substrate 52. The second touch electrode array may include a plurality of strip-shaped second touch electrodes 521 extending in a second direction X2 (i.e., n number of second touch electrodes 521 and n is an integer greater than or equal to 2).

Further, each of the first touch electrodes 511 provided on the array substrate 51 and each of the second touch electrodes 521 provided on the color film substrate 52 can form a mutual capacitor to detect the touch position. The touch signal terminals (not shown) of the circuit 512 can supply a touch drive signal to the first touch electrodes 511 via the first touch signal lines 513, and the touch sensing signals acquired by the second touch electrodes 521 can be received through the second touch signal lines 522 electrically connected to each of the second touch electrodes 521, realizing the touch position detection.

In addition, in certain embodiments, the first integrated circuit 512 may also include n number of touch sensitive signal receiving terminals. Each of the second touch electrodes 522 is electrically connected to one of the touch-sensitive signal receiving terminals, respectively, so that the first integrated circuit 512 can receive the touch-sensitive signals acquired by the second touch electrodes 521 through the respective touch-sensitive signal receiving terminals.

Figure 6:
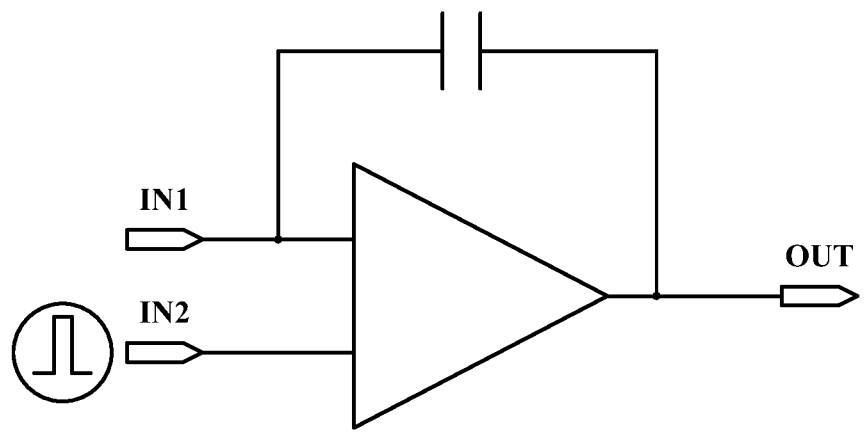
FIG. 6 illustrates a schematic block diagram of an integrator amplifier circuit included in a first integrated circuit of FIG. 5.

Further, in certain embodiments, the first integrated circuit 512 may also include a plurality of integrator amplifier circuits. FIG. 6 illustrates an exemplary integrator amplifier circuit.

As shown in FIG. 6, an integrator amplifier circuit may include a first input terminal IN1, a second input terminal IN2, and an output terminal OUT. The first input terminal IN1 may be electrically connected to one of the touch-sensitive signal receiving terminals, and the second input terminal IN2 may be electrically connected to a reference signal terminal. The output terminal OUT may provide an output signal to the first integrated circuit 512. Based on the output signals from the output terminals OUT from the plurality of integrator amplifier circuits, the first integrated circuit 512 may determine a touch position.

In addition, because the second touch electrode 521 and the second touch signal lines 522 may be located on the color film substrate 52, and the first integrated circuit 512 may be located on the array substrate 51, the touch display panel may also include a first flexible circuit board 523 such that the second touch signal lines 522 are electrically connected to the first integrated circuit 512.

The first flexible circuit board may include a plurality of input ports (not shown) and a plurality of output ports (not shown). Each of the second touch electrodes 521 is electrically connected to one of the input ports of the first flexible circuit board 523, and the output port of the first flexible circuit board 523 is electrically connected to one of the touch sensing signal receiving terminals. For example, each of the second touch electrodes 521 is electrically connected to the respective input ports of the first flexible circuit board 523 through the respective second touch signal lines 522, and the respective output ports of the first flexible circuit board 523 are electrically connected to the various touch-sensitive signal receiving terminals of the first integrated circuit 512.

Figure 7:
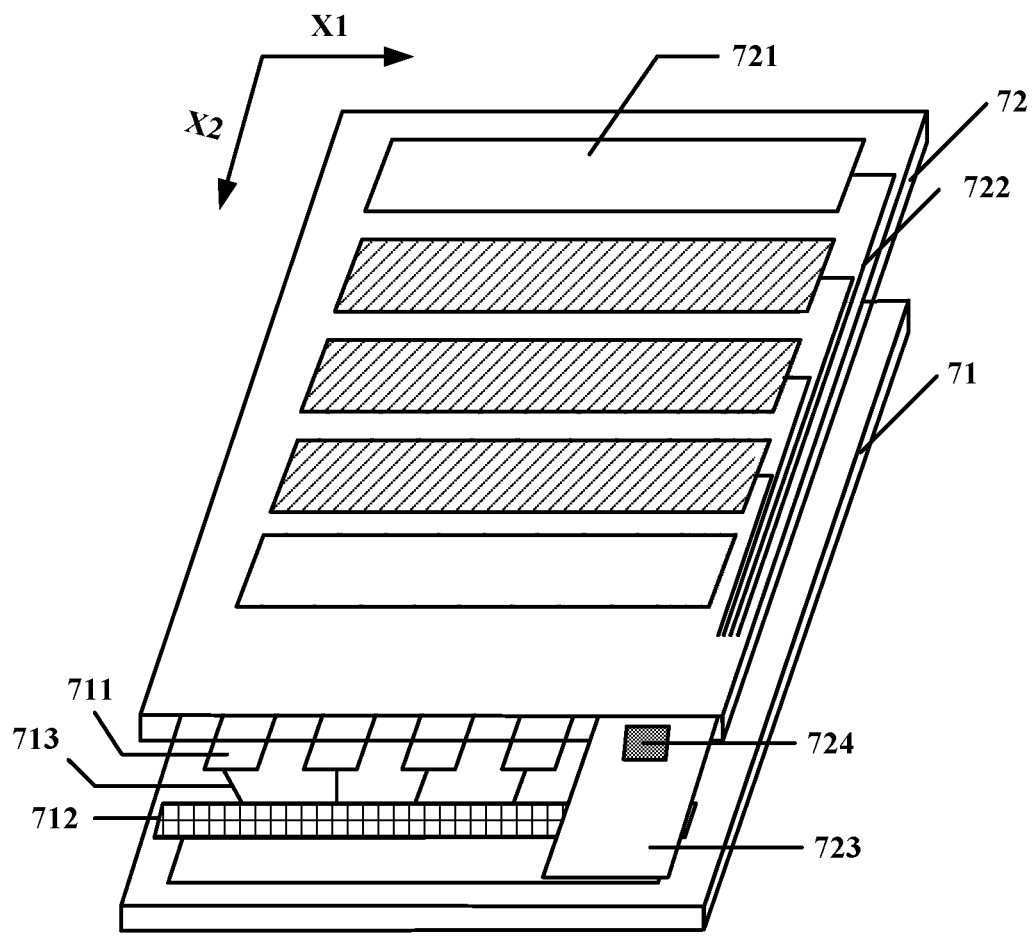
FIG. 7 illustrates a structural diagram of another exemplary touch display panel consistent with the disclosed embodiments.

FIG. 7 illustrates another exemplary touch display panel. As shown in FIG. 7, the touch display panel may include an array substrate 71, and a color film substrate 72 disposed opposite to the array substrate 71. Other components may also be included.

Similar to that shown in FIG. 5, the array substrate 71 may include any disclosed array substrate. The array substrate 71 may include a first touch electrode array having a plurality of first touch electrodes 711, a first integrated circuit 712, and a plurality of first touch signal lines 713. The color film substrate 72 may include a second touch electrode array, and the second touch electrode array may include a plurality of strip-shaped second touch electrodes 721 extending in a second direction X2 (i.e., n number of second touch electrodes 721) and second touch signal lines 722. The touch display panel may also include a first flexible circuit board 723.

Unlike that shown in FIG. 5, the touch display panel may further include a second integrated circuit 724. The second integrated circuit 724 may include a plurality of integrator amplifier circuits (not shown), and each of the integrator amplifier circuits may have the structure shown in FIG. 6. The second integrated circuit 724 may determine the touch position based on the output signals at the output ports of the integrator amplifier circuits.

Figure 8:
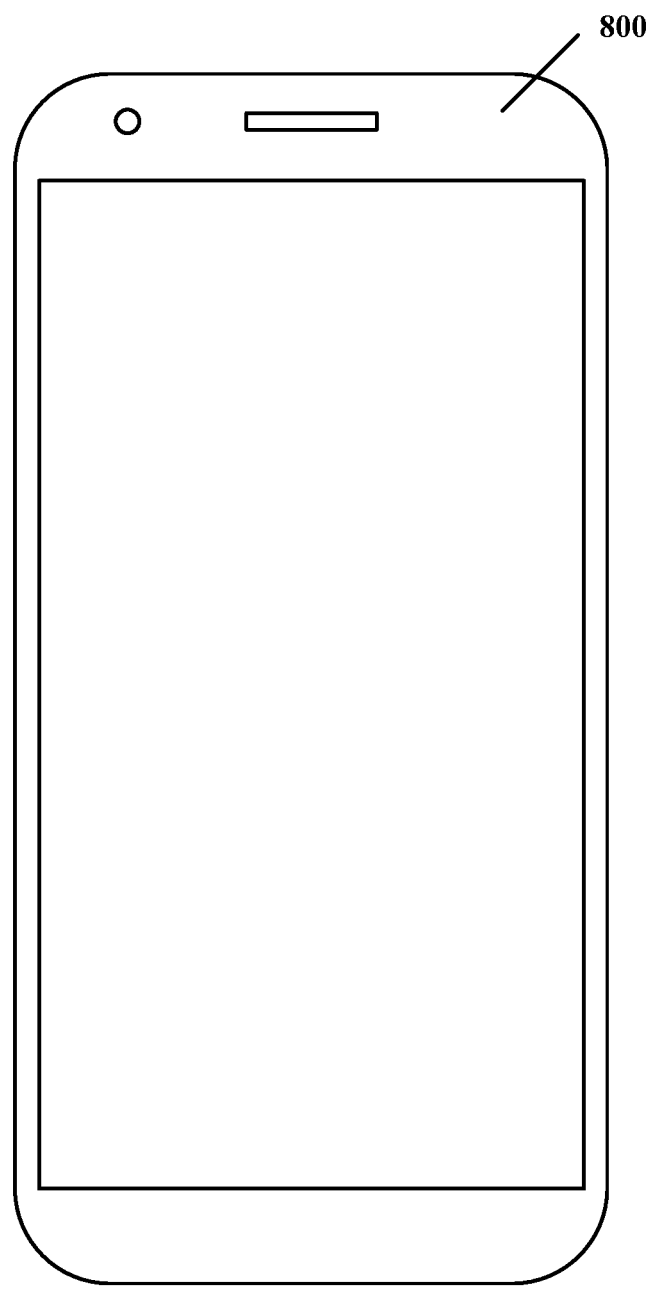
FIG. 8 illustrates a structural diagram of an exemplary touch display device consistent with the disclosed embodiments.

FIG. 8 illustrates an exemplary touch display device consistent with the disclosed embodiments. As shown in FIG. 8, a touch display device 800 is provided. The touch display device 800 may include a touch display panel as described above, which includes a disclosed array substrate. The touch display device may include any appropriate device having a touch display panel, such as a cellular mobile phone, a tablet, a computer, an intelligent wearable device, or a vehicle-based computing device, etc. As long as the touch display device contains the mechanism of the display panel/array substrate disclosed in the present disclosure, it should be considered to fall within the scope of protection of the present application.

Accordingly, the touch signal terminals of the integrated circuit are directly connected to the first touch signal lines to supply drive signals to the first touch electrodes, and drive circuits additionally provided in the frame are for providing the drive signals to the first touch electrodes can be avoided, facilitating the realization of narrower frames of touch display panels and touch display devices.

After taking into consideration the specification and practicing the disclosure disclosed herein, those skilled in the relevant art may easily obtain other embodiments of the present disclosure. The present disclosure is intended to cover any variation, usage, or adaptable change of the present disclosure. These variations, usages, or adaptable changes may obey general principles of the present disclosure and include common knowledge or common technical solutions not disclosed by the present disclosure in the relevant technical field. The specification and the embodiments are merely exemplary, and the true scope and spirit of the present disclosure are defined by the appended claims.

What is claimed is:

1. An array substrate, comprising:
   a first touch electrode array having m number of strip-shaped first touch electrodes extending in a first direction, wherein m is an integer greater than 2;
   a first integrated circuit having m number of touch signal terminals, each of which is used to provide a drive signal to a corresponding first touch electrode;
   a plurality of first touch signal lines, each of which is connected between one of the touch signal terminals and one of the first touch electrodes for transmitting the drive signal supplied from each touch signal terminal to the corresponding first touch electrode; and
   a plurality of data lines extending in the first direction, and the first integrated circuit has a plurality of data signal terminals connected with the plurality of data lines, wherein:
   the first integrated circuit has a first symmetry axis located at the center of the first integrated circuit and extending in the first direction,
   both the m number of touch signal terminals and the plurality of data signal terminals are symmetrically arranged on two sides of the first symmetry axis, and a distance between each touch signal terminal and the first symmetry axis is greater than a distance between each data signal terminal and the first symmetry axis,
   the drive signal includes a touch drive signal and a display drive signal, during a display stage of a frame period, each touch signal terminal supplies the display drive signal to the corresponding first touch electrode, and during a touch detection stage of the frame period, each touch signal terminal supplies the touch drive signal to the corresponding first touch electrode.

2. The array substrate according to claim 1, further including:
a plurality of scanning lines formed in a first metal layer of the array substrate and extending in a second direction;
the plurality of data lines formed in a second metal layer of the array substrate; and
a display pixel array including a plurality of display pixels formed by the scanning lines and data lines insulated and intersected with each other,
wherein the first touch signal lines, the scanning lines, and the data lines are insulated from one another.

3. The array substrate according to claim 2, wherein:
the first integrated circuit includes a plurality of scan signal terminals for providing a scan drive signal to each scanning line, and the plurality of data signal terminals for providing a data signal to each data line,
wherein the distance between each touch signal terminal and the first symmetry axis is greater than a distance between each scan signal terminal and the first symmetry axis.

4. The array substrate according to claim 2, further including:
a third metal layer formed on the array substrate, wherein the first touch signal lines are formed in the third metal layer.

5. The array substrate according to claim 1, wherein:
the touch detection stage includes k number of touch detection sub-stages, where k is an integer greater than or equal to 2; and
during an i-th touch detection sub-stage, a touch signal terminal electrically connected to a j-th first touch electrode provides a touch drive signal to the j-th first touch electrode, and touch signal terminals electrically connected to the other first touch electrodes provide the display drive signal to the other first touch electrodes, wherein i, j, k each is a natural number, and $1 \leq i$, $j \leq k$, and $m \leq k$.

6. The array substrate according to claim 1, wherein:
the touch detection stage includes a first touch detection sub-stage and a second touch detection sub-stage;
during the first touch detection sub-stage, touch signal terminals electrically connected to odd-numbered first touch electrodes sequentially apply the touch drive signal to the odd-numbered first touch electrodes, and touch signal terminals electrically connected to even number of first touch electrodes apply the display drive signal to the even-numbered first touch electrodes; and
during the second touch detection sub-stage, the touch signal terminals electrically connected to the even number of first touch electrodes sequentially apply the touch drive signal to the even-numbered first touch electrodes, and the touch signal terminals electrically connected to the odd-numbered first touch electrodes apply the display drive signal to the odd-numbered first touch electrodes.

7. The array substrate according to claim 1, wherein:
the touch detection stage includes [m/2] number of touch detection sub-stages; and
during a p-th touch detection sub-stage, p being a natural number and $1 \leq p \leq [m/2]$, touch signal terminals electrically connected to a p-th first touch electrode and a (m−p+1)-th first touch electrode sequentially apply a touch drive signal to the p-th first touch electrode and the (m−p+1)-th first touch electrode, and other touch signal terminals electrically connected to other first touch electrodes apply the display drive signal to the other first touch electrodes.

8. The array substrate according to claim 1, wherein:
the first touch electrode array includes q number of first-touch-electrode groups, q being a natural number greater than or equal to 2, each first-touch-electrode group includes at least two adjacent first touch electrodes, and adjacent two first-touch-electrode groups include at least one common first touch electrode;
the touch detection stage includes at least q number of touch detection sub-stages; and
during a touch detection sub-stage, touch signal terminals electrically connected to first touch electrodes in one first-touch-electrode group simultaneously apply the touch drive signal to each of the first touch electrodes in the one first-touch-electrode group.

9. The array substrate according to claim 1, wherein:
the display drive signal is a common voltage signal.

10. A display panel, comprising:
an array substrate; and
a color film substrate disposed opposite to the array substrate,
wherein the array substrate includes:
a first touch electrode array having m number of strip-shaped first touch electrodes extending in a first direction, wherein m is an integer greater than 2;
a first integrated circuit having m number of touch signal terminals, each of which is used to provide a drive signal to a corresponding first touch electrode;
a plurality of first touch signal lines, each of which is connected between one of the touch signal terminals and one of the first touch electrodes for transmitting the drive signal supplied from each touch signal terminal to the corresponding first touch electrode; and
a plurality of data lines extending in the first direction, and the first integrated circuit has a plurality of data signal terminals connected with the plurality of data lines, wherein:
the first integrated circuit has a first symmetry axis located at the center of the first integrated circuit and extending in the first direction,
both the m number of touch signal terminals and the plurality of data signal terminals are symmetrically arranged on two sides of the first symmetry axis, and a distance between each touch signal terminal and the first symmetry axis is greater than a distance between each data signal terminal and the first symmetry axis,
the drive signal includes a touch drive signal and a display drive signal,
during a display stage of a frame period, each touch signal terminal supplies the display drive signal to the corresponding first touch electrode, and
during a touch detection stage of the frame period, each touch signal terminal supplies the touch drive signal to the corresponding first touch electrode.

11. The display panel according to claim 10, further including:
a second touch electrode array disposed on the color film substrate, wherein the second touch electrode array includes n number of strip-shaped second touch electrodes extending in a second direction, n being a natural number greater than or equal to 2.

12. The display panel according to claim 11, wherein:
the first integrated circuit includes n number of touch-sensitive signal receiving terminals, and each of the second touch electrodes is electrically connected to one of the touch-sensitive signal receiving terminals, respectively.

13. The display panel according to claim 12, wherein:
the first integrated circuit includes a plurality of integrator amplifier circuits;
each integrator amplifier circuit includes a first input terminal, a second input terminal, and an output terminal;
the first input terminal is electrically connected to one of the touch-sensitive signal receiving terminals, and the second input terminal is electrically connected to a reference signal terminal, the output terminal provides an output signal to the first integrated circuit; and
the first integrated circuit determines a touch position based on output signals from the output terminals of the plurality of integrator amplifier circuits.

14. The display panel according to claim 12, further including:
a first flexible circuit board having a plurality of input ports and a plurality of output ports; and
each of the second touch electrodes is electrically connected to one of the input ports of the first flexible circuit board, and each output port of the first flexible circuit board is electrically connected to one of the touch-sensitive signal receiving terminals.

15. The display panel according to claim 12, further including:
a second integrated circuit having a plurality of integrator amplifier circuits;
each integrator amplifier circuit includes a first input terminal, a second input terminal, and an output terminal;
the first input terminal is electrically connected to one of the second touch electrodes, and the second input terminal is electrically connected to a reference signal terminal, the output terminal provides an output signal to the second integrated circuit; and
the second integrated circuit determines a touch position based on output signals from the output terminals of the plurality of integrator amplifier circuits.

16. A display device comprising the display panel according to claim 10.

17. An array substrate, comprising:
a first touch electrode array having m number of strip-shaped first touch electrodes extending in a first direction, wherein m is an integer greater than 2;
a first integrated circuit having m number of touch signal terminals, each of which is used to provide a drive signal to a corresponding first touch electrode;
a plurality of first touch signal lines, each of which is connected between one of the touch signal terminals and one of the first touch electrodes for transmitting the drive signal supplied from each touch signal terminal to the corresponding first touch electrode; and
a plurality of scanning lines extending in a second direction intersecting the first direction, and the first integrated circuit has a plurality of scan signal terminals connected with the plurality of scanning lines, wherein:
the first integrated circuit has a first symmetry axis located at the center of the first integrated circuit and extending in the first direction,
a distance between each touch signal terminal and the first symmetry axis is less than a distance between each scan signal terminal and the first symmetry axis,
the drive signal includes a touch drive signal and a display drive signal,
during a display stage of a frame period, each touch signal terminal supplies the display drive signal to the corresponding first touch electrode, and
during a touch detection stage of the frame period, each touch signal terminal supplies the touch drive signal to the corresponding first touch electrode.

18. The array substrate according to claim 17, wherein:
the first integrated circuit includes the plurality of scan signal terminals for providing a scan drive signal to each scanning line, and a plurality of data signal terminals for providing a data signal to each data line;
wherein the distance between each touch signal terminal and the first symmetry axis is less than a distance between each data signal terminal and the first symmetry axis.

* * * * *